United States Patent Office 3,086,919
Patented Apr. 23, 1963

3,086,919
DEHYDROGENATION OF STEROIDS BY MICROORGANISMS OF THE GENUS FLAVOBACTERIUM
Masao Isono and Matazo Abe, Nishinomiya, Japan, assignors to Takeda Chemical Industries, Ltd., Osaka, Japan
No Drawing. Filed Nov. 21, 1961, Ser. No. 154,061
Claims priority, application Japan Aug. 18, 1958
9 Claims. (Cl. 195—51)

The present application is a continuation-in-part of copending application, Serial No. 834,415, filed August 18, 1959.

This invention relates to a process for preparing $\Delta^1$-dehydrosteroids by the use of microorganisms of the genus Flavobacterium or enzyme produced by them.

For a long time the present inventors have been searching for those microorganisms which are able to form a double bond between the positions 1 and 2 in ring A of steroids, thereby producing $\Delta^1$-dehydrosteroids, and found that many microorganisms belonging to the genus Flavobacterium have excellent ability to achieve the results.

The present invention has been accomplished based on the new finding and further studies and relates to a process for preparing $\Delta^1$-dehydrosteroids which is characterized by bringing steroids belonging to the pregnane or androstane series, in which the positions 1 and 2 in the steroid skeleton are saturated with hydrogen, into contact with the culture of microorganisms belonging to the genus Flavobacterium, or with the oxidase produced by the microorganisms.

The starting materials used in the method of this invention are those saturated or unsaturated steroids belonging to the pregnane or androstane series, in which the positions 1 and 2 in ring A are saturated with hydrogen and positions other than 1 and 2 may be substituted by an oxo, hydroxyl, halogeno, carboxyl, alkyl group or the like, and the hydroxyl group may be protected in the form of ether or ester and the oxo group in the form of ketal, hydrazone or semicarbazone.

Typical ones of these steroids are as follows:

Pregnane-3,20-dione
$\Delta^{4,11}$-pregnadiene-3,20-dione
$\Delta^4$-pregnene-3,20-dione
$\Delta^4$-pregnen-11 (or 1,14,17 or 21)-ol-3,20-dione
$\Delta^4$-pregnen-14 (or 17 or 21)-ol-3,11,20-trione
$\Delta^4$-pregnene-17,21-diol-3,20-dione
$\Delta^4$-pregnene-17,21-diol-3,11,20-trione
$\Delta^4$-pregnene-11,21-diol-3,20-dione
$\Delta^4$-pregnene-11,17,21-triol-3,20-dione
$\Delta^4$-pregnene-11,16,17,21-tetrol-3,20-dione
6 and/or 9-(di)fluoro-$\Delta^4$-pregnene-11,17,21-triol-3,20-dione
6-methyl-$\Delta^4$-pregnene-17,21-diol-3,11,20-trione
$\Delta^4$-pregnene-17,19,21-triol-3,20-dione
$\Delta^4$-pregnene-11,20,21-triol-3-one
Allopregnene-3,20-dione
Androstane-3,17-dione
$\Delta^4$-androsten-17-ol-3-one
$\Delta^4$ (or $\Delta^5$-androstene-3,17-dione)
$\Delta^4$-androstene-3,11,17-trione Or their derivatives produced by changing their hydroxyl group into ester, ether, or halogenide and their oxo group into ketal, hydrazone, or semicarbazone.

As mentioned before, many microorganisms belonging to the genus Flavobacterium can be used in the method of this invention, but it is desirable to select those microorganisms which have excellent catalytic activity for dehydrogenation.

Microorganisms especially suitable for the dehydrogenation of steroids are as follows, for example.

Flavobacterium sp. IFO No. 3344
*Flavobacterium aquatile* (Flankland and Flankland) Bergey et al.
*Flavobacterium lutescence* (Migula) Bergey et al.

The names of the genus of the above microorganisms are all based on "Bergey's Manual of Determinative Bacteriology," 7th edition, published by The Williams and Wilkins Co., Baltimore, Md., U.S.A., in 1957. Those microorganisms which lack in species name were separated by the present inventors and deposited in Institute for Fermentation, Osaka, Japan under the number of IFO, respectively, and their microbial characteristics are as follows:

Flavobacterium sp. IFO No. 3344
  Rods, 0.6–0.8 by 1.0–1.5 microns, occurring singly and in pairs. Endospore not formed. Non-motile. Gram-negative.
  Gelatin stab: Slow crateriform liquefaction.
  Agar slant: Growth pale yellow, filiform, smooth, becoming sulfur-yellow.
  Broth: Turbid with yellowish white sediment.
  Litmus milk: Alkaline after prolonged cultivation.
  Potato: Yellow streak.
  Indole not produced.
  Hydrogen sulfide produced.
  No acid and gas from glucose.
  Starch not hydrolyzed.
  Methyl red and Voges-Proskauer tests negative.
  Citrates, p-hydroxybenzoates, phenylacetates are utilized as sole source of carbon.
  Nitrites produced from nitrates.
  Catalase-positive.
  Aerobic.
  Optimum temperature, between 30° and 35° C.

In general, the incubation of microorganisms in this method is effected under the conditions of oxidizing fermentation.

Nutrient media suitable for the growth of microorganisms contain carbon source, nitrogen source assimilable by the microorganisms, and necessary inorganic salts. As carbon source are used glucose, sucrose, dextrin, starch, and glycerin, for example and as nitrogen source are employed nitrogen containing organic substances such as peptone, meat extract, casein, edamine, corn steep liquor, yeast, and yeast extract, organic compounds such as amino acids, ammonium salts of organic acids, urea, and inorganic nitrogen compounds such as nitrates and ammonium salts. Necessary inorganic salts are potassium phosphate, sodium chloride, magnesium sulfate, etc., and the media may contain such metals as copper, manganese, cobalt, and nickel. For a large scale run a liquid medium is convenient.

The incubation of microorganisms may be effected statically but it is more advantageous to conduct it under aerobic conditions such as submerged culture under aeration with shaking or stirring.

Contact of the material steroids with the culture of microorganisms or with their enzyme is effected by bringing the mycelium separated from the culture broth or the oxidase separated from the mycelium into contact with the material steroids, or by adding the material steroids to the medium at a proper stage of the incubation. In the latter case, the material is added at once or over a period as fine powder or as a solution or suspension in a suitable solvent such as methanol, ethanol, ethylene glycol, propylene glycol, dimethylformamide, dioxane, and water, or as a solution or suspension containing a surface active agent or a dispersing agent. The pH of the substrate solution, incubation temperature, incubation time, and other conditions are different depending on the kind and quantity of the starting steroids and the kind of the microorganisms used, and therefore optimal conditions are selected in each case. In general, however, the incubation is conducted at pH 6–9, 25–30° C. for 3–50 hours, but these conditions are not necessarily specific.

According to the kind of microorganisms, their activities are different. If the incubation is carried out too long, using a strain of a microorganism with strong activity, the $\Delta^1$-dehydrosteroids once accumulated are decomposed resulting in a poor yield. Therefore, the most important factor for obtaining good yield of $\Delta^1$-dehydrosteroids is incubation time, and in general less than 24 hours is preferable.

The $\Delta^1$-dehydrosteroids thus accumulated in the culture broth can be separated by various methods. For example, they are first adsorbed on a proper absorbent such as alumina, magnesium silicate, or active carbon and then eluted with a suitable solvent such as methanol or ethanol, or directly extracted with a solvent immiscible with water such as chloroform, methylene chloride, or ethylene chloride, or subjected to counter current distribution. Or they are separated by chromatography using alumina, silica gel, cellulose, or pulp as carrier, or utilizing their difference in solubility in various solvents, or leading them to their functional derivatives with Girard reagent T or P or with a lower aliphatic acid anhydride and a deacidating agent.

The products of the present invention, $\Delta^1$-dehydrosteroids, are useful, for example, as medicines having activities of cortical hormones and/or sexual hormones, or as intermediates for producing such medicines.

*Example 1*

A solution of 15 g. of polypeptone, 7.5 g. of meat extract, and 3 g. of $KH_2PO_4$ in 1.5 l. of tap water is adjusted to pH 7.0 to prepare a nutrient medium.

A 500 cc.-portion of the nutrient medium is poured into each of three 2 l.-culture flasks and is sterilized by heating under 1.5 atmospheres pressure for 15 minutes. A strain of Flavobacterium sp. IFO No. 3344 is inoculated into each medium and incubated at 28° C. for 24 hours with shaking. At the end of the time a solution of 100 mg. of $\Delta^4$-pregnene-11$\beta$,17$\alpha$,21-triol-3,20-dione in 4 cc. of dioxane is added to each medium and the incubation is continued for additional 24 hours under the same conditions. The culture broths are combined and extracted four times with 1 l.-portions of ethyl acetate, and the extract is concentrated under reduced pressure to leave ca. 580 mg. of a residue. The residue is dissolved in 100 cc. of methanol and the solution, after being decolorized with 1.0 g. of active carbon, is evaporated to give 225 mg. of $\Delta^{1,4}$-pregnadiene-11$\beta$,17$\alpha$,21-triol-3,20-dione.

The strain used in this example is deposited in Institute for Fermentation, Osaka, and ATCC with numbers of IFO–3344 and ATCC–13552, respectively.

*Example 2*

A strain of Flavobacterium sp. IFO No. 3344 is incubated with 100 mg. of $\Delta^4$-pregnene-17$\alpha$,21-diol-3,20-dione under the same conditions as in Example 1. The culture broth is treated in the same manner as in Example 1 to give 65 mg. of $\Delta^{1,4}$-pregnadiene-17$\alpha$,21-diol-3,20-dione.

*Example 3*

A strain of Flavobacterium sp. IFO No. 3344 is inoculated into 500 cc. of the same nutrient medium as in Example 1 in a 2 l.-culture flask and incubated at 28° C. for 24 hours. A solution of 300 mg. of $\Delta^4$-pregnene-11$\beta$,17$\alpha$,21-triol-3,20-dione in 4 cc. of dioxane is added to the medium and the incubation is continued for additional 24 hours under the same conditions. The culture broth is extracted with ethyl acetate and ca. 440 mg. of a crude product is obtained from the extract. The crude product is dissolved in a little methylene chloride, the solution is poured on a column packed with synthetic magnesium silicate, and the column is eluted with a mixture of methylene chloride and ethyl acetate. The fraction containing the desired product, $\Delta^{1,4}$-pregnadiene-11$\beta$,17$\alpha$,21-triol-3,20-dione, is separated and evaporated, and the residue is recrystallized from ethyl acetate to give 205 mg. of the product.

$\Delta^4$-pregnene-17$\alpha$,21-diol-3,11,20-trione, $\Delta^4$-pregnen-21-ol-3,20-dione, $\Delta^4$-pregnen-3,20-dione or 9$\alpha$-fluoro-$\Delta^4$-pregnene-11$\beta$,17$\alpha$,21-triol-3,20-dione can be oxidized in a similar way to the above to produce $\Delta^{1,4}$-pregnadiene-17$\alpha$,21-diol-3,20-dione, $\Delta^{1,4}$-pregnadien-21-ol-3,20-dione, $\Delta^{1,4}$-pregnadiene-3,20-dione or 9$\alpha$-fluoro-$\Delta^{1,4}$-pregadiene-11$\beta$,17$\alpha$,21-triol-3,20-dione, respectively.

*Example 4*

A mixture of 300 g. of glucose, 300 g. of meat extract, 150 g. of cornsteep liquor and 150 g. of sodium chloride is dissolved in tap water to make 30 liters of an aqueous solution. The aqueous solution is adjusted to pH 7.0 with sodium hydroxide, and then sterilized by heating to prepare a nutrient medium.

A strain of Flavobacterium sp. IFO No. 3344 is inoculated into the nutrient medium and incubated for 48 hours at 28° C. with agitation under aeration. At the end of this time a solution of 12 g. of 17$\alpha$-methyl-$\Delta^4$-androsten-17$\beta$-ol-3-one in 150 cc. of ethanol is added to the medium and the incubation is continued for additional 48 hours under the same conditions. The culture broth obtained is extracted with 30 liters of ethyl acetate. The extract is washed subsequently with 1% aqueous solution of sodium hydrogen carbonate and with water, and dried with anhydrous sodium sulfate, and then concentrated under a reduced pressure. The residue is dissolved in a small quantity of benzene and the solution is poured onto a column packed with synthetic magnesium silicate, and the column is eluted with a solvent system of benzene-ethyl acetate. The fraction eluted with benzene-ethyl acetate (9:1) is concentrated to dryness and the powdery residue is recrystallized from ethyl acetate to give 4.7 g. of 17$\alpha$-methyl-$\Delta^{1,4}$-androstadien-17$\beta$-ol-3-one.

The above examples represent presently-preferred illustrative embodiments of the invention, and in these examples, "cc." stands for cubic centimeters, "g." stands for grams, "mg." for milligrams, and "l." for liters.

Having thus disclosed the invention what is claimed is:

1. A process converting a compound selected from the group consisting of steroids of the pregnane and androstane series, in which at least the positions 1 and 2 are saturated, into the corresponding $\Delta^1$-dehydrosteroid, which comprises bringing said compound into contact with an enzyme system of an oxidase-producing microorganism selected from the group consisting of Flavobacterium sp. (IFO–3344; ATCC–13552), *Flavobacterium aquatile* (Flankland and Flankland), and *Flavobacterium lutescence* (Migula) whereby a double bond is introduced between the positions 1 and 2 to yield the said $\Delta^1$-compound.

2. A process converting a compound selected from the group consisting of steroids of the pregnane and androstane series, in which at least the positions 1 and 2 are saturated, into the corresponding $\Delta^1$-dehydrosteroid, which comprises bringing said compound into contact with the enzyme system of Flavobacterium sp. (IFO–3344; ATCC–13552), thereby introducing a double bond between the positions 1 and 2 of the steroid and producing the corresponding $\Delta^1$-steroid.

3. The process claimed in claim 2, wherein the starting steroid compound is selected from the group consisting of pregnane-3,20-dione,
$\Delta^{4,11}$-pregnadiene-3,20-dione,
$\Delta^4$-pregnene-3,20-dione,
$\Delta^4$-pregnen-11-ol-3,20-dione,
$\Delta^4$-pregnen-12-ol-3,20-dione,
$\Delta^4$-pregnen-14-ol-3,20-dione,
$\Delta^4$-pregnen-17-ol-3,20-dione,
$\Delta^4$-pregnen-21-ol-3,20-dione,
$\Delta^4$-pregnen-14-ol-3,11,20-trione,
$\Delta^4$-pregnen-17-ol-3,11,20-trione,
$\Delta^4$-pregnen-21-ol-3,11,20-trione,
$\Delta^4$-pregnene-17,21-diol-3,20-dione,
$\Delta^4$-pregnene-17,21-diol-3,11,20-trione,
$\Delta^4$-pregnene-11,21-diol-3,20-dione,
$\Delta^4$-pregnene-11,17,21-triol-3,20-dione,
$\Delta^4$-pregnene-11,16,17,21-tetrol-3,20-dione,
6-(di)fluoro-$\Delta^4$-pregnene-11,17,21-triol-3,20-dione,
9-(di)fluoro-$\Delta^4$-pregnene-11,17,21-triol-3,20-dione,
6-methyl-$\Delta^4$-pregnene-17,21-diol-3,11,20-trione,
$\Delta^4$-pregnene-17,19,21-triol-3,20-dione,
$\Delta^4$-pregnene-11,20,21-triol-3-one,
allopregnane-3,20-dione,
androstane-3,17-dione,
$\Delta^4$-androsten-17-ol-3-one,
$\Delta^4$-androstene-3,17-dione,
$\Delta^5$-androstene-3,17-dione,
$\Delta^4$-androstene-3,11,17-trione, and
17α-methyl-$\Delta^4$-androsten-17β-ol-3-one.

4. A process for converting $\Delta^4$-pregnene-11β,17α,21-triol-3,20-dione into $\Delta^{1,4}$-pregnadiene-11β,17α,21-triol-3,20-dione, which comprises bringing the former into contact with an enzyme system of Flavobacterium sp. (IFO–3344; ATCC–12552), whereby a double bond is introduced between the positions 1 and 2 to yield the said $\Delta^{1,4}$-compound.

5. A process for converting $\Delta^4$-pregnene-17α,21-diol-3,20-dione into $\Delta^{1,4}$-pregnadiene-17α,21-diol-3,20-dione, which comprises bringing the former into contact with an enzyme system of Flavobacterium sp. (IFO-3344; ATCC–12552), whereby a double bond is introduced between the positions 1 and 2 to yield the said $\Delta^{1,4}$-compound.

6. A process for converting $\Delta^4$-pregnen-21-ol-3,20-dione into $\Delta^{1,4}$-pregnadien-21-ol-3,20-dione, which comprises bringing the former into contact with an enzyme system of Flavobacterium sp. (IFO-3344; ATCC–12552), whereby a double bond is introduced between the positions 1 and 2 to yield the said $\Delta^{1,4}$-compound.

7. A process for converting $\Delta^4$-pregnen-3,20-dione into $\Delta^{1,4}$-pregnadiene-3,20-dione, which comprises bringing the former into contact with an enzyme system of Flavobacterium sp. (IFO-3344; ATCC–12552), whereby a double bond is introduced between the positions 1 and 2 to yield the said $\Delta^{1,4}$-compound.

8. A process for converting 9α-fluoro-$\Delta^4$-pregnene-11β,17α,21-triol-3,20-dione into 9α-fluoro-$\Delta^{1,4}$-pregnadiene-11β,17α,21-triol-3,20-dione, which comprises bringing the former into contact with an enzyme system of Flavobacterium sp. (IFO-3344; ATCC–12552), whereby a double bond is introduced between the positions 1 and 2 to yield the said $\Delta^{1,4}$-compound.

9. A process for converting 17α-methyl-$\Delta^4$-androsten-17β-ol-3-one into 17α-methyl-$\Delta^{1,4}$-androstadien-17β-ol-3-one, which comprises bringing the former into contact with an enzyme system of Flavobacterium sp. (IFO–3344; ATCC–12552), whereby a double bond is introduced between the positions 1 and 2 to yield the said $\Delta^{1,4}$-compound.

References Cited in the file of this patent

UNITED STATES PATENTS 3,013,011     Nussbaum et al.          Dec. 12, 1961

UNITED STATES PATENT OFFICE
CERTIFICATE OF CORRECTION

Patent No. 3,086,919                        April 23, 1963

Masao Isono et al.

It is hereby certified that error appears in the above numbered patent requiring correction and that the said Letters Patent should read as corrected below.

Column 1, line 59, for "Allopregnene-3,20-dione" read -- Allopregnane-3,20-dione --; column 4, line 16, for "21-diol-3,20-dione" read -- 21-diol-3,11,20-trione --; column 5, line 36, and column 6, lines 5, 11, 17, 24 and 31, for "12552", each occurrence, read -- 13552 --.

Signed and sealed this 25th day of February 1964.

(SEAL)
Attest:

ERNEST W. SWIDER
Attesting Officer

EDWIN L. REYNOLDS
Acting Commissioner of Patents